United States Patent [19]

Flores et al.

[11] Patent Number: 5,502,128
[45] Date of Patent: Mar. 26, 1996

[54] GROUP 4 METAL AMIDINATE CATALYSTS AND ADDITION POLYMERIZATION PROCESS USING SAME

[75] Inventors: Juan C. Flores; Marvin D. Rausch, both of Amherst, Mass.

[73] Assignee: University of Massachusetts, Amherst, Mass.

[21] Appl. No.: 354,341

[22] Filed: Dec. 12, 1994

[51] Int. Cl.⁶ ............................ C08F 4/42; C08F 112/08; B01J 31/38
[52] U.S. Cl. ........................ 526/160; 502/349; 502/351; 526/126; 526/347; 526/347.1
[58] Field of Search ................................ 526/160, 126, 526/347, 347.1; 502/349, 351

[56] References Cited

U.S. PATENT DOCUMENTS 5,045,517  9/1991  Campbell, Jr. et al. .
5,066,741  11/1991  Campbell, Jr. .
5,206,197  4/1993  Campbell, Jr. .

FOREIGN PATENT DOCUMENTS

93/03067  2/1993  WIPO .

OTHER PUBLICATIONS

A. N. Chernega et al, *J. Chem. Soc., Chem. Commun.* (1993) 1415–17.
D. Fenske et al, *Z. Naturforsch* (1988) 43b, 1611–15.
H. W. Roesky, et al., *Chem Ber.*, 1988, 121, 1403–6.

*Primary Examiner*—Fred Zitomer

[57] ABSTRACT

Amidinate Group 4 metal complexes wherein the metal is in the +2, +3 or +4 formal oxidation state and activating cocatalysts or activating techniques are used to produce catalysts useful for polymerizing olefins. In particular, vinylaromatic monomers are polymerized to form highly syndiotactic polymers.

9 Claims, No Drawings

GROUP 4 METAL AMIDINATE CATALYSTS AND ADDITION POLYMERIZATION PROCESS USING SAME

BACKGROUND OF THE INVENTION

This invention relates to certain novel Group 4 metal amidinate catalyst compositions and addition polymerization processes using the same. In particular the present invention relates to such polymerization processes that prepare polymers of vinylaromatic monomers having a syndiotactic stereostructure.

It is previously known in the art to prepare highly syndiotactic polymers of vinyl aromatic monomers by the use of Group 4 metal complexes containing a single cyclopentadienyl or substituted cyclopentadienyl group and an activating cocatalyst. Suitable, cocatalysts include alkylalumoxanes, inert, noncoordinating ion forming compounds, Lewis acids and mixtures thereof. Disclosures of such prior art processes are found in U.S. Pat. Nos. 5,045,517, 5,066,741, 5,206,197 and WO 92/05823 (equivalent to U.S. Ser. No. 07/740529, filed Aug. 5, 1991). The teachings of all of the foregoing patents and patent applications and publications is hereby incorporated by reference.

Recently ($\eta^5$-cyclopentadienyl)titanium benzamidinate dichloride and ($\eta^5$-cyclopentadienyl)titanium benzamidinate dialkyl complexes were shown to be useful in the polymerization of ethylene and propylene. A. N. Chernega, et al., *J. Chem. Soc., Chem. Commun.*, 1993, 1415. Other researchers have prepared a variety of N,N'-bis substituted benzamidinato metal complexes. D. Fenske, et al., *Z. Naturforsch*, 1988, 43b, 1611, H. W. Roesky, et al., *Chem. Ber.*, 1988, 121, 1403. The use of metal complexes containing only one amidinate moiety in the formation of addition polymerization catalysts, particularly catalysts for polymerization of monovinyl aromatic monomers to form syndiotactic polymers, has been previously unknown.

SUMMARY OF THE INVENTION

According to the present invention there are provided certain catalyst compositions comprising:
A)
1) a Group 4 metal complex corresponding to the formula:

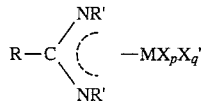

or a dimer thereof, wherein:

M is titanium, zirconium or hafnium in the +2, +3 or +4 formal oxidation state;

R is an inert ligand group of up to 20 nonhydrogen atoms; and

R' independently each occurrence is a group selected from hydrocarbyl, silyl, halohydrocarbyl and mixtures thereof, said R' having up to 10 nonhydrogen atoms;

X is an anionic ligand group having up to 40 atoms exclusive of the class of ligands that are cyclic, delocalized, n-bound ligand groups;

X' independently each occurrence is a neutral Lewis base ligating compound, having up to 20 atoms;

p is 1, 2 or 3, and is one less than the formal oxidation state of M; and q is 0, 1 or 2, and 2) an activating cocatalyst;
the molar ratio of 1) to 2) being from 1:10,000 to 100:1; or
B) the reaction product formed by converting 1) to an active catalyst by use of an activating technique.

Moreover, according to the present invention there is provided a process for preparing polymers of addition polymerizable monomers comprising contacting an addition polymerizable monomer with a catalyst comprising:
A)
1) a Group 4 metal complex corresponding to the formula:

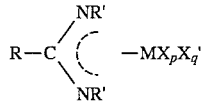

or a dimer thereof, wherein:

M is titanium, zirconium or hafnium in the +2, +3 or +4 formal oxidation state;

R is an inert ligand group of up to 20 nonhydrogen atoms; and

R' independently each occurrence is a group selected from hydrocarbyl, silyl, halohydrocarbyl and mixtures thereof, said R' having up to 10 nonhydrogen atoms;

X is an anionic ligand group having up to 40 atoms exclusive of the class of ligands that are cyclic, delocalized, n-bound ligand groups;

X' independently each occurrence is a neutral Lewis base ligating compound, having up to 20 atoms;

p is 1, 2 or 3, and is one less than the formal oxidation state of M, and q is 0, 1 or 2; and 2) an activating cocatalyst;
the molar ratio of 1) to 2) being from 1:10,000 to 100:1; or
B) the reaction product formed by converting 1) to an active catalyst by use of an activating technique.

Finally, according to the present invention there is provided a process for preparing syndiotactic polymers of vinylaromatic monomers comprising contacting a vinylaromatic monomer with a catalyst comprising:
A)
1) a Group 4 metal complex corresponding to the formula:

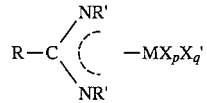

or a dimer thereof, wherein:

M is titanium, zirconium or hafnium in the +2, +3 or +4 formal oxidation state;

R is an inert ligand group of up to 20 nonhydrogen atoms; and

R' independently each occurrence is a group selected from hydrocarbyl, silyl, halohydrocarbyl and mixtures thereof, said R' having up to 10 nonhydrogen atoms;

X is an anionic ligand group having up to 40 atoms exclusive of the class of ligands that are cyclic, delocalized, n-bound ligand groups;

X' independently each occurrence is a neutral Lewis base ligating compound, having up to 20 atoms;

p is 1, 2 or 3, and is one less than the formal oxidation state of M; and q is 0, 1 or 2, and 2) an activating cocatalyst;
the molar ratio of 1) to 2) being from 1:10,000 to 100:1; or B) the reaction product formed by converting 1) to an active catalyst by use of an activating technique.

DETAILED DESCRIPTION

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

Addition polymerizable monomers as used herein included $C_{2-30}$ aliphatic and aromatic compounds containing ethylenic unsaturation. Preferred monomers are $C_{2-10}$ α-olefins, monovinyl aromatic monomers and mixtures thereof. Highly preferred monovinyl aromatic monomers include styrene as well as $C_{1-4}$ ring alkyl substituted styrene compounds. Most preferred vinylaromatic monomers are styrene, and vinyltoluene. Polymers formed from such monomers are highly useful items in commerce for production of molded articles, fibers and foamed objects.

As used herein, the term "syndiotactic" refers to polymers having a stereoregular structure of greater than 50 percent, preferably greater than 75 percent syndiotactic of a racemic triad as determined by $^{13}C$ nuclear magnetic resonance spectroscopy. Such polymers may be usefully employed in the preparation of articles and objects via compression molding, injection molding or other suitable technique having an extremely high resistance to deformation due to the effects of temperature.

Preferred X' groups are carbon monoxide; phosphines, especially trimethylphosphine, triethylphosphine, triphenylphosphine and bis(1,2-dimethylphosphino)ethane; $P(OR)_3$, wherein R is as previously defined; ethers, especially tetrahydrofuran; amines, especially pyridine, bipyridine, tetramethylethylenediamine (TMEDA), and triethylamine.

Preferred coordination complexes used according to the present invention are complexes corresponding to the formula:

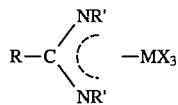

wherein:

M is titanium or zirconium;

R is a aryl or perfluorinated alkyl group of up to 10 carbons;

R' is hydrocarbyl, silyl, or a mixture thereof said R' having up to 10 nonhydrogen atoms; and X is an anionic ligand selected from the group consisting of halide, hydrocarbyl, hydrocarbyloxy, di(hydrocarbyl)amido, di(hydrocarbyl)phosphido, hydrocarbylsulfido, and silyl groups, said X group having up to 20 nonhydrogen atoms.

Most preferred coordination complexes used according to the present invention are complexes corresponding to the formula:

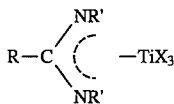

wherein:

R each occurrence is phenyl, tolyl, halophenyl, alkoxyphenyl, dialkylaminophenyl, haloalkylphenyl, nitrophenyl, cyanophenyl, or trifluoromethyl;

R' is methyl or trimethylsilyl; and

X is chloride, $C_{1-6}$ alkyl, $C_{1-4}$ alkoxide or phenoxide.

Examples of the above metal complexes include: (N,N-dimethyl-p-toluamidinate)titanium (IV) trichloride; (N,N-bis(trimethylsilyl)-p-toluamidinate)titanium (IV) trichloride; (N,N-dimethylbenzamidinate)titanium (IV) trichloride; (N,N-bis(trimethylsilyl)benzamidinate)titanium (IV) trichloride; (N,N-dimethyl-p-toluamidinate)titanium (IV) trimethyl; (N,N-bis(trimethylsilyl)-p-toluamidinate)titanium (IV) trimethyl; (N,N-dimethylbenzamidinate)titanium (IV) trimethyl; (N,N-bis(trimethylsilyl)benzamidinate)titanium (IV) trimethyl; (N,N-dimethyl-p-toluamidinate)zirconium (IV) trichloride; (N,N-bis(trimethylsilyl)-p-toluamidinate)zirconium (IV) trichloride; (N,N-dimethylbenzamidinate)zirconium (IV) trichloride; (N,N-bis(trimethylsilyl)benzamidinate)zirconium (IV) trichloride; (N,N-dimethyl-p-toluamidinate)zirconium (IV) trimethyl; (N,N-bis(trimethylsilyl)-p-toluamidinate)zirconium (IV) trimethyl; (N,N-dimethylbenzamidinate)zirconium (IV) trimethyl; and (N,N-bis(trimethylsilyl)benzamidinate)zirconium (IV) trimethyl. Additional complexes that are variously substituted as herein defined will be readily apparent to the skilled artisan.

In general, the complexes can be prepared by combining a metallated amidinate compound wherein the metal is a Group 1 or Group 2 metal or Grignard with a compound of the formula $MX_{p+1}X'_q$. Different X ligands may also be substituted in the complexes by use of a subsequent Grignard reaction. Optionally a reducing agent can also be employed to produce the lower oxidation state complexes. The reactions are conducted in a suitable noninterfering solvent at a temperature from −100° to 300° C., preferably from −78° to 100° C., most preferably from 0° to 50° C. By the term "reducing agent" herein is meant a metal or compound which, under reducing conditions causes the metal M, to be reduced from a higher to a lower oxidation state. Examples of suitable metal reducing agents are alkali metals, alkaline earth metals, aluminum and zinc, alloys of alkali metals or alkaline earth metals such as sodium/mercury amalgam and sodium/potassium alloy. Examples of suitable reducing agent compounds are sodium naphthalenide, potassium graphite, lithium alkyls, lithium or potassium alkadienyls; and Grignard reagents. Most preferred reducing agents are the alkali metals or alkaline earth metals, especially lithium and magnesium metal.

Suitable reaction media for the formation of the complexes include aliphatic and aromatic hydrocarbons, ethers, and cyclic ethers, particularly branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing are also suitable.

The complexes are rendered catalytically active by combination with an activating cocatalyst or by use of an activating technique. Suitable activating cocatalysts for use herein include polymeric or oligomeric alumoxanes, especially methylalumoxane, triisobutyl aluminum modified methylalumoxane, or isobutylalumoxane; neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium- salts of compatible, noncoordinating anions, or ferrocenium salts of compatible, noncoordinating anions; bulk electrolysis (explained in more detail hereinafter); and combinations of the foregoing activating cocatalysts and techniques. The foregoing activating cocatalysts and activating techniques have been previously taught with respect to different metal complexes in the following references: EP-A-277,003, U.S. Pat. Nos. 5,153,157, 5,064,802, EP-A-468,651 (equivalent to U.S. Ser. No. 07/547,718), EP-A-520,732 (equivalent to U.S. Ser. No. 07/876,268), and EP-A-520,732 (equivalent to U.S. Ser. No. 07/884,966 filed May 1, 1992), the teachings of which are hereby incorporated by reference.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane are especially desirable activating cocatalysts.

Suitable ion forming compounds useful as cocatalysts in one embodiment of the present invention comprise a cation which is a Bronsted acid capable of donating a proton, and a compatible, noncoordinating anion, $A^-$. As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by the vinylaromatic monomer. Suitable metals include, but are not limited to, aluminum, gold and platinum. Suitable metalloids include, but are not limited toy boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula: $(L^*\text{-}H)^{d+}(A^{d-})$ wherein:

$L^*$ is a neutral Lewis base;

$(L^*\text{-}H)^+$ is a Bronsted acid;

$A^{d-}$ is a noncoordinating, compatible anion having a charge of d-, and d is an integer from 1 to 3.

More preferably $A^{d-}$ corresponds to the formula: $(M'^{k+}Q_{n'})^{d-}$ wherein:

k is an integer from 1 to 3;

n' is an integer from 2 to 6;

n'−k= d;

M' is an element selected from Group 13 of the Periodic Table of the Elements; and Q independently each occurrence is selected from hydride, dialkylamido, halide, hydrocarbyl, hydrocarbyloxide, halosubstituted-hydrocarbyl, halosubstituted hydrocarbyloxy, and halo- substituted silylhydrocarbyl radicals (including perhalogenated hydrocarbyl- perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433, the teachings of which are herein incorporated by reference.

In a more preferred embodiment, d is one, that is, the counter ion has a single negative charge and is $A^-$. Activating cocatalysts comprising boron which are particularly useful in the preparation of catalysts of this invention may be represented by the following general formula: $(L^*\text{-}H)^+(BQ_4)^-$;

wherein:

$L^*$ is as previously defined;

B is boron in a valence state of 3; and

Q is a hydrocarbyl-, hydrocarbyloxy-, fluorinated hydrocarbyl-, fluorinated hydrocarbyloxy-, or fluorinated silylhydrocarbyl- group of up to 20 nonhydrogen atoms, with the proviso that in not more than one occasion is Q hydrocarbyl.

Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-2,4,6-trimethylanilinium tetraphenylborate, trimethylammonium tetrakis(pentafluorophenyl) borate, triethylammonium tetrakis(pentafluorophenyl) borate, tripropylammonium tetrakis(pentafluorophenyl) borate, tri(n-butyl)ammonium tetrakis(pentafluorophenyl) borate, tri(sec-butyl)ammonium tetrakis(pentafluorophenyl) borate, N,N-dimethylanilinium tetrakis(pentafluorophenyl) borate, N,N-dimethylanilinium n-butyltris(pentafluorophenyl) borate, N,N-dimethylanilinium benzyltris(pentafluorophenyl) borate, N,N-dimethylanilinium tetrakis(4-(t-butyldiimethylsilyl)- 2,3,5,6-tetrafluorophenyl) borate, N,N-dimethylanilinium tetrakis(4-(triisopropylsilyl)-2,3,5,6-tetrafluorophenyl) borate, N,N-dimethylanilinium pentafluorophenoxytris(pentafluorophenyl) borate, N,N-diethylanilinium tetrakis(pentafluorophenyl) borate, N,N-dimethyl-2,4,6-trimethylanilinium tetrakis(pentafluorophenyl) borate, trimethylammonium tetrakis(2,3,4,6-tetrafluorophenyl) borate, triethylammonium tetrakis(2,3,4,6-tetrafluorophenyl) borate, tripropylammonium tetrakis(2,3,4,6-tetrafluorophenyl) borate, tri(n-butyl)ammonium tetrakis(2,3,4,6-tetrafluorophenyl) borate, dimethyl(t-butyl)ammonium tetrakis(2,3,4,6-tetrafluorophenyl) borate, N,N-dimethylanilinium tetrakis(2,3,4,6-tetrafluorophenyl) borate, N,N-diethylanilinium tetrakis(2,3,4,6-tetrafluorophenyl) borate, and N,N-dimethyl-2,4,6-trimethylanilinium tetrakis(2,3,4,6-tetrafluorophenyl) borate;

dialkyl ammonium salts such as: di-(i-propyl)ammonium tetrakis(pentafluorophenyl) borate, and dicyclohexylammonium tetrakis(pentafluorophenyl) borate;

tri-substituted phosphonium salts such as: triphenylphosphonium tetrakis(pentafluorophenyl) borate, tri(o-tolyl)phosphonium tetrakis(pentafluorophenyl) borate, and tri(2,6-dimethylphenyl)phosphonium tetrakis(pentafluorophenyl) borate;

di-substituted oxonium salts such as: diphenyloxonium tetrakis(pentafluorophenyl) borate, di(o-tolyl)oxonium tetrakis(pentafluorophenyl) borate, and di(2,6-dimethylphenyl)oxonium tetrakis(pentafluorophenyl) borate;

di-substituted sulfonium salts such as: diphenylsulfonium tetrakis(pentafluorophenyl) borate, di(o-tolyl)sulfonium tetrakis(pentafluorophenyl) borate, and bis(2,6-dimethylphenyl)sulfonium tetrakis(pentafluorophenyl) borate.

Preferred $(L^*-H)^+$ cations are N,N-dimethylanilinium and tributylammonium.

Another suitable ion forming, activating cocatalyst comprises a salt of a cationic oxidizing agent and a noncoordinating, compatible anion represented by the formula: $(Ox^{e+})_d(A^{d-})_e$.

wherein:

$Ox^{e+}$ is a cationic oxidizing agent having a charge of e+;

e is an integer from 1 to 3; and $A^{d-}$ and d are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula: $©^+ A^-$ wherein:

$©^+$ is a $C_{1-20}$ carbenium ion; and $A^-$ is as previously defined. A preferred carbenium ion is the trityl cation, i.e. triphenylmethylium.

A further suitable ion forming, activating cocatalyst comprises a compound which is a salt of a silylium ion and a noncoordinating, compatible anion represented by the formula: $R_3Si(X')_q^+ A^-$ wherein:

R is $C_{1-10}$ hydrocarbyl, and X', q and $A^-$ are as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem. Comm.*, 1993, 383–384, as well as Lambert, J. B., et al., *Organometallics*, 1994, 13, 2430–2443. The use of the above silylium salts as activating cocatalysts for addition polymerization catalysts is claimed in U.S. patent aplication entitled Silylium Cationic Polymerization Activators For Metallocene Complexes, filed in the names of David Neithamer, David Devore, Robert LaPointe and Robert Mussell on Sep. 12, 1994.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433, the teachings of which are herein incorporated by reference. Preferred complexes include phenol, especially fluorinated phenol adducts of tris(pentafluorophenyl)borane. The latter cocatalysts are disclosed and claimed in U.S. patent application entitled Phenol-Borane Adduct Polymerization Activators For Metallocene Complexes, filed in the name of Peter Nickias on Sep. 12, 1994.

The technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are: liquids under the conditions of the electrolysis (generally temperatures from 0° to 100° C.), capable of dissolving the supporting electrolyte, and inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), dimethoxyethane (DME), and mixtures thereof.

The electrolysis may be conducted in a standard electrolytic cell containing an anode and cathode (also referred to as the working electrode and counter electrode respectively). Suitable materials of construction for the cell are glassy plastic, ceramic and glass coated metal. The electrodes are prepared from inert conductive materials, by which are meant conductive materials that are unaffected by the reaction mixture or reaction conditions. Platinum or palladium are preferred inert conductive materials. Normally an ion permeable membrane such as a fine glass frit separates the cell into separate compartments, the working electrode compartment and counter electrode compartment. The working electrode is immersed in a reaction medium comprising the metal complex to be activated, solvent, supporting electrolyte, and any other materials desired for moderating the electrolysis or stabilizing the resulting complex. The counter electrode is immersed in a mixture of the solvent and supporting electrolyte. The desired voltage may be determined by theoretical calculations or experimentally by sweeping the cell using a reference electrode such as a silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and a compatible, noncoordinating anion, $A^-$. Preferred supporting electrolytes are salts corresponding to the formula $G^+A^-$; wherein:

$G^+$ is a cation which is nonreactive towards the starting and resulting complex, and $A^-$ is as previously defined.

Examples of cations, $G^+$, include tetrahydrocarbyl substituted ammonium or phosphonium cations having up to 40 nonhydrogen atoms. Preferred cations are the tetra(n-butylammonium)- and tetraethylammonium- cations.

During activation of the complexes of the present invention by bulk electrolysis the cation of the supporting electrolyte passes to the counter electrode and $A^-$ migrates to the working electrode to become the anion of the resulting oxidized product. Either the solvent or the cation of the supporting electrolyte is reduced at the counter electrode in equal molar quantity with the amount of oxidized metal complex formed at the working electrode. Preferred supporting electrolytes are tetrahydrocarbylammonium salts of tetrakis(perfluoroaryl) borates having from 1 to 10 carbons in each hydrocarbyl or perfluoroaryl group, especially tetra(n-butylammonium)tetrakis(pentafluorophenyl) borate.

A further recently discovered electrochemical technique for generation of activating cocatalysts is the electrolysis of a disilane compound in the presence of a source of a noncoordinating compatible anion. This technique is more fully disclosed and claimed in the previously mentioned U.S. patent application entitled, "Silylium Cationic Polymerization Activators For Metallocene Complexes", filed on Sep. 12, 1994.

The foregoing activating techniques and ion forming cocatalysts are also preferably used in combination with a tri(hydrocarbyl)aluminum or tri(hydrocarbyl)borane compound having from 1 to 4 carbons in each hydrocarbyl group, an oligomeric or polymeric alumoxane compound, or a mixture of a tri(hydrocarbyl)aluminum compound having from 1 to 4 carbons in each hydrocarbyl group and a polymeric or oligomeric alumoxane.

The molar ratio of catalyst/cocatalyst employed preferably ranges from 1:10,000 to 100:1, more preferably from 1:5000 to 10:1, most preferably from 1:1000 to 1:1. In a further embodiment of the invention the cocatalyst can be used in combination with a tri(hydrocarbyl)aluminum compound having from 1 to 10 carbons in each hydrocarbyl group. Mixtures of activating cocatalysts may also be employed. It is possible to employ these aluminum compounds for their beneficial ability to scavenge impurities such as oxygen, watery and aldehydes from the polymerization mixture. Preferred aluminum compounds include trialkyl aluminum compounds having from 1 to 6 carbons in each alkyl group, especially those wherein the alkyl groups are methyl, ethyl, propyl, isopropyl, n-butyl, isobutyl, pentyl, neopentyl, or isopentyl. Preferred molar ratios of trialkylaluminum compound to alkylalumoxane are from 0.1:1 to 10:1, more preferably from 0.25:1 to 1:1.

Preferred alumoxane compounds are methylalumoxane, modified methylalumoxane (that is, methylalumoxane modified by reaction with triisobutyl aluminum) (MMAO) and isobutylalumoxane.

The most highly preferred activating cocatalyst for use in forming active addition polymerization catalysts is an alkylalumoxane, especially methylalumoxane, isopropylalumoxane or isopropylaluminum modified methylalumoxane.

Suitable addition polymerizable monomers other than monovinyl aromatic monomers include ethylene, propylene, isobutylene, 1-butene, 1-hexene, 3-methyl-1-pentene, 4-methyl-1-pentene, 1-octene, 4-vinylcyclohexene, vinylcyclohexane and mixtures thereof.

In general, the polymerization may be accomplished at conditions well known in the prior art for Ziegler-Natta or Kaminsky-Sinn type polymerization reactionst i.e., temperatures from 0°–250° C., preferably 30° to 85° C. and pressures from atmospheric to 10,000 atmospheres. Suspension, solution, slurry, gas phase, solid state powder polymerization or other process condition may be employed if desired. A support, especially silica, alumina, or a polymer (especially poly(tetrafluoroethylene) or a polyolefin) may also be employed. The support is preferably employed in an amount to provide a weight ratio of catalyst (based on metal):support from 1:100,000 to 1:10, more preferably from 1:50,000 to 1:20, and most preferably from 1:10,000 to 1:30.

In most polymerization reactions the molar ratio of catalyst:polymerizable compounds employed is from $10^{-12}:1$ to $10^{-1}:1$, more preferably from $10^{-9}:1$ to $10^{-5}:1$.

Suitable solvents for polymerization are inert liquids. Examples include straight and branched-chain hydrocarbons such as isobutane, butane, pentane, hexane, heptane, octane, and mixtures thereof (including monomers subject to polymerization, especially the previously mentioned addition polymerizable monomers); cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes, and the like and aromatic and alkyl-substituted aromatic compounds such as benzene, toluene, xylene, styrene, ethylbenzene and the like. Mixtures of the foregoing are also suitable.

Desirably the polymerization is conducted by contacting the monomer and catalyst composition under conditions to produce a polymer having molecular weight from 200,000 to 450,000. In the determination of such molecular weights herein the technique used is that of solution viscometry using 1,3,5-trichlorobenzene at 135° C., calibrated with gel permeation chromatography using an atactic polystyrene standard. The number is a unit less value reflecting the weight average molecular weight, Mw. Efficiencies of the present process are generally sufficient to provide a percent conversion after one hour polymerization of at least 30 weight percent, preferably at least 50 weight percent, most preferably at least 60 weight percent.

The skilled artisan will appreciate that the invention disclosed herein may be practiced in the absence of any component which has not been specifically disclosed. The following examples are provided as further illustration thereof and are not to be construed as limiting. Unless stated to the contrary all parts and percentages are expressed on a weight basis.

All operations were performed under an argon atmosphere using Schlenk or glove-box techniques. Argon was deoxygenated with activated BTS catalyst and dried with molecular sieves and $P_2O_5$. Solvents were purified by distillation from Na/K alloy or $CaH_2$. Styrene was distilled from $CaH_2$ and stored at −25° C. under argon in darkness. $Li[N(SiMe_3)_2]\cdot Et_2O$, $Li[C_6H_5C(NSiMe_3)_2]\cdot Et_2O$, $C_6H_5C(NSiMe_3)N(SiMe_3)_2$, and $\{[\eta\text{-}C_6H_5C(NSiMe_3)_2]TiCl_3\}$ were synthesized according to published procedures. NMR spectra were recorded on IBM ESP 200 and IBM ESP 80 spectrometers. Chemical shifts (δ) are reported relative to external TMS ($^1H$) or $H_3PO_4$ ($^{31}P$).

EXAMPLE 1

N,N'-bis(trimethylsilyl)benzamidinate titanium (IV) triisopropoxide

A solution of $Li[PhC(NSiMe_3)_2]\cdot Et_2O$ (7.14 g, 20.7 mmol) in 100 mL of ethyl ether was added dropwise to a solution of Ti(O—CH(CH$_3$)$_2$)$_3$Cl (5.40 g, 20.7 mmol) in ethyl ether (50 mL) and out of light. After the addition was completed, stirring was continued for 1.5 h. Filtration of the LiCl precipitate and thorough evaporation of the solvent (all manipulations at 0° C. and out of light) gave a clear, slightly pale-yellow oil. This oil, without further purifications was characterized as the desired compound spectroscopically and was analytically pure (10.10 g, 99.8 percent). The product was stored at −25° C. in darkness.

analysis: calculated for C$_{22}$H$_{44}$N$_2$Si$_2$O$_3$Ti: C, 54.07; H, 9.08; N, 5.73. Found: C, 53.82; H. 8.82; N, 5.66. $^1$H NMR (CDCl$_3$) δ–0.11 (s, 18 H, SiMe$_3$), 1.28 (d, J=6.0 Hz, 18 H, OCH(CH$_3$)$_2$); 4.76 (hept, J=6.0 Hz, 3 H, OCH(CH$_3$)$_2$), 7.10–7.40 (m, 5 H, Ph). IR (CH$_2$Cl$_2$). No vC=N band, vC=N 1500 cm$^{-1}$, v(i—Pr) 1360 (d) and 1155 cm−1, vSiMe$_3$ 1235 and 835 cm −1.

EXAMPLE 2

(N,N'-dimethyl-p-toluamidinate)titanium (IV) trichloride dimer

A) Preparation of N-trimethylsilyl-N,N'-dimethyl-p-toluamidine p-Tolunitrile (35.14 g, 0.30 mol) was contacted with lithium dimethylamide (15.31 g, 0.30 mol) in diethyl ether (250 mL) at room temperature. Replacement of the solvent by toluene, subsequent reaction with chlorotrimethylsilane (38.1 mL, 0.30 mol) and work-up of the reaction mixture afforded N-trimethylsilyl-N,N'-dimethyl-p-toluamidine in 52 percent yield. Fractional high vacuum distillation of this crude product (85° C., 2×10$^{-3}$ Torr) allowed the isolation of the pure product (36–37 g) as a low-melting (28° C.) colorless crystalline solid. The $^1$H NMR spectrum showed the aromatic protons of the tolyl group as an apparent doublet of doublets (δ 7.08 ppm) due to an AA'BB' slitting pattern characteristic in para unsymmetrically disubstituted benzenes. The two methyl groups attached to the nitrogens were recorded as a broad singlet (~16 Hz) at 2.88 ppm.

B) Preparation of (N,N'-dimethyl-p-toluamidinate)titanium (IV) trichloride dimer Slow addition of N-trimethylsilyl-N,N'-dimethyl-p-toluamidine (5.58 g, 23.8 mmol) to a solution of TiCl$_4$ (4.52 g, 23.8 mmol) in CH$_2$Cl$_2$ (30 mL) at room temperature, followed by stirring for 1 h and removal of the solvent, led to the dimer {[p–MeC$_6$H$_4$C(NMe)$_2$]TiCl$_3$}$_2$. The product was obtained as a fine yellow-orange powder and was recrystallized from CH$_2$Cl$_2$, affording it analytically pure as a moisture sensitive orange powder (5.21 g, 69%). The $^1$H NMR spectrum showed the AA'BB' splitting pattern for the protons on the aromatic ring, a singlet for the methyl protons of the tolyl group, and two singlets for the methyls attached to the nitrogens.

EXAMPLE 3

N,N'-dimethyl-p-toluamidinate titanium (IV) trichloride·THF

In an NMR tube scale experiment, a solution of N,N'-dimethyl-p-toluamidinate titanium (IV) trichloride dimer in CDCl$_3$ was treated with an excess of THF (8:1) and the spectrum was recorded. The volatiles were then carefully removed, keeping the samples under vacuum overnight. The spectrum was again recorded by redissolving the solid in CDCl$_3$. The $^1$H NMR spectrum of this solid was identical to the spectrum recorded after the addition of THF, except that one molecule of THF was present per amidinante ligand, indicating the formation of [n–MeC$_6$H$_4$C(NMe$_2$)$_2$]TiCl$_3$·THF.

EXAMPLE 4

N,N'-dimethyl-p-toluamidinate titanium (IV) trichloride·P(CH$_3$)$_3$

The reaction conditions of Example 3 were repeated using PMe$_3$ instead of THF. The corresponding phosphine adduct [n–MeC$_6$H$_4$C(NMe$_2$)$_2$]TiCl$_3$·PMe$_3$ was identified by $^1$H NMR.

EXAMPLE 5

N,N'-bis(trimethylsilyl)benzamidinate titanium (IV) trichloride dimer

The reaction conditions of Example 1 were substantially repeated using titanium tetrachloride in place of Ti(O—CH(CH$_3$)$_2$)$_3$Cl. The resulting product was identified as N,N'-bis(trimethylsilyl)benzamidinate titanium (IV) trichloride dimer by $^1$H NMR.

EXAMPLE 6

N,N'-bis(trimethylsily)benzamidinate titanium (IV) trichloride·THF

{[η-C$_6$H$_5$C(NSiMe$_3$)$_2$]TiCl$_3$}$_2$ (0.53 g, 1.27 mmol based on Ti) was dissolved in THF (10 mL) at room temperature and stirred for 1 h. The solvent was then thoroughly removed under reduced pressure, producing the desired complex as a red crystalline solid in quantitative yield.

Analysis: calculated for C$_{17}$H$_{31}$N$_2$OSi$_2$TiCl$_3$: C, 41.68, H, 6.38: N, 5.72. Found: C. 41.43; H, 6.21; N, 5.82 $^1$H NMR (CDCl$_3$) δ0.17 (s, 18 H, SiMe$_3$); 1.92 (m, 4 H, THF), 3.96 (m, 4 H, THF), 7.20–7.60 (m, 5 H, Ph).

EXAMPLE 7

N,N'-bis(trimethylsilyl)benzamidnate titanium (IV) trichloride·P(CH$_3$)$_3$

A solution of {[η-C$_6$H$_5$C(NSiMe$_3$)$_2$]TiCl$_3$}$_2$ (2.30 g, 55.0 mmol based on Ti) in THF (30 mL) was treated with PMe$_3$ (0.58 mL, 55 mmol) at room temperature. The solution turned immediately from red to oranges but stirring was continued for an additional 2 h. Concentration and cooling of the solution allowed the collection of a first fraction of orange-red crystals (1.53 g), identified as the desired compound. The filtrate afforded a second fraction (0.94 g), for a total yield of 2.47 g (91 percent).

Analysis: calculated for C$_{16}$H$_{32}$N$_2$PSi$_2$TiCl$_3$: C, 38.90; H, 6.53; N, 5.67. Found: C, 38.76; H, 6.52; N, 5.46. $^1$H NMR (CDCl$_3$) δ0.11 (s, 18 H, SiMe$_3$), 1.44 (d, $^2J_{P-H}$=9.0 Hz, 9 H, PMe$_3$), 7.10–7.50 (m, 5 H, Ph). $^{31}$P{$^1$H}NMR: δ–13.9 (s, PMe$_3$).

EXAMPLE 8

N,N'-bis(trimethylsilyl)benzamidinate titanium (IV) methyl dichloride dimer

To a solution of $\{[\eta\text{-}C_6H_5C(NSiMe_3)_2]TiCl_3\}_2$ (1.40 g, 1.67 mmol) in ethyl ether (30 mL) at $-20°$ C. was added methyllithium (2.40 mL, 3.35 mmol, 1.4M ethyl ether solution) dropwise and very slowly. Once the addition was completed, the reaction mixture was stirred for 3 h at $-20°$ C. Lithium chloride was filtered and the solution was concentrated under reduced pressure until ca. 10 mL remained. Cooling the solution overnight produced yellow-orange crystals. Recrystallization from pentane afforded the desired complex as a yellow microcrystalline solid (1.00 g, 78 percent). $^1$H NMR ($C_6D_6$) $\delta 0.13$ (s, 18 H, $SiMe_3$), 2.30 (s, 3 H, TiMe), 6.70–7.20 (m, 5 H, Ph).

POLYMERIZATION STUDIES

Polymerizations were carried out in toluene in 250 mL crown-capped glass pressure reactors equipped with magnetic stirring and thermostated to the desired temperature. Toluene was added first (50 mL), followed by styrene (5.0 mL), (*=100 mL toluene, 10 mL styrene), MAO, and finally the appropriate metal complex. Polymerizations were conducted for 1.5 hours. The polymerization reactions were terminated by addition of acidified methanol. The polymer was washed with methanol and dried in vacuo to constant weight. The polymer obtained was extracted with refluxing 2-butanone for 12 h and the insoluble fraction again dried in vacuo to constant weight. DSC of polymers was performed on a Perkin-Elmer Thermal System IV. Results are contained in Table I.

TABLE I

| | | | | | Styrene Polymerization | | | |
|---|---|---|---|---|---|---|---|---|
| Run | Complex | [cat.] (Mm) | Al/Ti | $T_p$ (°C.) | Yield PS (mg) | $A \times 10^{-5}$[1] | $SY^2$ | $T_m$ (°C.) |
| 1 | Ex. 2 | 0.025 | 4000 | 20 | 53 | 5.0 | 77 | — |
| 2 | Ex. 2 | 0.050 | 4000 | 20 | 59 | 3.6 | 68 | — |
| 3 | Ex. 2 | 0.050 | 2000 | 20 | 77 | 4.7 | 84 | — |
| 4 | Ex. 5 | 0.050 | 4000 | 25 | 28 | 1.7 | 93 | — |
| 5 | Ex. 5 | 0.025 | 4000 | 25 | 30 | 3.7 | 93 | 270 |
| 6 | Ex. 5 | 0.025 | 2000 | 25 | 36 | 4.4 | 94 | 272 |
| 7 | Ex. 5 | 0.025 | 2000 | 50 | 46 | 5.6 | 85 | 265 |
| 8 | Ex. 1 | 0.025 | 2000 | 25 | 19 | 2.3 | 95 | 272 |
| 9* | Ex. 6 | 0.025 | 2000 | 25 | 30 | 1.8 | 93 | 273 |
| 10* | Ex. 7 | 0.025 | 2000 | 25 | 19 | 1.2 | 95 | 273 |

[1]g PS/(mol Ti · mol styrene · h).
[2]Syndiotacticity calculated as weight percent of polystyrene insoluble in refluxing 2-butanone.

Ethylene was polymerized under similar reaction conditions using the same reactor as was employed for styrene polymerizations. The amount of toluene solvent was 50 mL. The reaction temperature was 20° C. Ethylene pressure was 10 psig (70 kPa) ($[C_2H_4]$=0.03076M). The molar ratio of methylalumoxane/titanium was 2000 ($[Ti]$=0.025 mM). Reaction time was 2 hours. Results are contained in Table II.

TABLE II

| | | Ethylene Polymerization | | | |
|---|---|---|---|---|---|
| Run | Complex | Yield PE (mg) | $A \times 10^{-4}$[1] | $T_M$(°C.) | $M_w \times 10^{-5}$ |
| 11 | Ex. 1 | 13 | 1.7 | 136 | — |
| 12 | Ex. 2 | 40 | 5.7 | — | 0.96 |
| 13 | Ex. 2 | 115 | 8.3 | — | 0.78 |
| 14 | Ex. 2 | 97 | 7.0 | — | 1.03 |

[1]g PE/(mol Ti) · $[C_2H_4]$ · h).

What is claimed is:

1. A process for preparing polymers of addition polymerizable monomers comprising contacting an addition polymerizable monomer under addition polymerization conditions with a catalyst composition comprising:

1) a Group 4 metal complex corresponding to the formula:

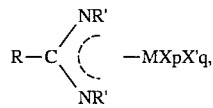

MXpX'q, or a dimer thereof, wherein:

M is titanium, zirconium or hafnium in the +2, +3 or +4 formal oxidation state;

R is an inert ligand group of up to 20 nonhydrogen atoms; and

R' independently each occurrence is a group selected from hydrocarbyl, sily, halohydrocarbyl and mixtures thereof, said R' having up to 10 nonhydrogen atoms;

X is an anionic ligand group having up to 40 atoms exclusive of the class of ligands that are cyclic, delocalized, n-bound ligand groups;

X' independently each occurrence is a neutral Lewis base ligating compound, having up to 20 atoms;

p is 1, 2 or 3, and is one less than the formal oxidation state of M; and q is 0, 1 or 2, and 2) an activating cocatalyst;
the molar ratio of 1) to 2) being from 1:10,000 to 100:1; or
B) the reaction product formed by converting 1) to an active catalyst by use of an activating technique.

2. A process according to claim 1 wherein the metal complex corresponds to the formula:

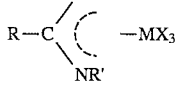

wherein:

M is titanium or zirconium;

R is an aryl or perfluorinated alkyl group of up to 10 carbons;

R' is hydrocarbyl, silyl, or a mixture thereof said R' having up to 10 nonhydrogen atoms; and X is an anionic ligand selected from the group consisting of halide, hydrocarbyl, hydrocarbyloxy, di(hydrocarbyl)amido, di(hydrocarbyl)phosphido, hydrocarbylsulfido, and silyl groups, said X group having up to 20 nonhydrogen atoms.

3. A process according to claim 1 wherein the metal complex corresponds to the formula:

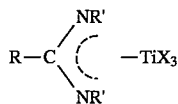

wherein:

R each occurrence is phenyl, tolyl, halophenyl, alkoxyphenyl, dialkylaminophenyl, haloalkylphenyl, nitrophenyl, cyanophenyl, or trifluoromethyl;

R' is methyl or trimethylsilyl; and

X is chloride, $C_{1-6}$ alkyl, $C_{1-4}$ alkoxide or phenoxide.

4. A process according to claim 1 wherein the metal complex is (N,N-dimethyl-p-toluamidinate)titanium (IV) trichloride; (N,N-bis(trimethylsilyl)-p-toluamidinate)titanium (IV) trichloride; (N,N-dimethylbenzamidinate)titanium (IV) trichloride; (N,N-bis(trimethylsilyl)benzamidinate)titanium (IV) trichloride; (N,N-dimethyl-p-toluamidinate)titanium (IV) trimethyl; (N,N-bis(trimethylsilyl)-p-toluamidinate)titanium (IV) trimethyl; (N,N-dimethylbenzamidinate)titanium (IV) trimethyl; (N,N-bis(trimethylsilyl)benzamidinate)titanium (IV) trimethyl; (N,N-dimethyl-p-toluamidinate)zirconium (IV) trichloride; (N,N-bis(trimethylsilyl)-p-toluamidinate)zirconium (IV) trichloride; (N,N-dimethylbenzamidinate)zirconium (IV) trichloride; (N,N-bis(trimethylsilyl)benzamidinate)zirconium (IV) trichloride; (N,N-dimethyl-p-toluamidinate)zirconium (IV) trimethyl; (N,N-bis(trimethylsilyl)-p-toluamidinate)zirconium (IV) trimethyl; (N,N-dimethylbenzamidinate)zirconium (IV) trimethyl; or (N,N-bis(trimethylsilyl)benzamidinate)zirconium (IV) trimethyl.

5. A process according to claim 1 wherein the monomer is a monovinyl aromatic monomer and the polymer is syndiotactic.

6. A process according to claim 5 wherein the monovinyl aromatic monomer is selected from the group consisting of styrene and $C_{1-4}$ alkyl ring substituted styrene compounds.

7. A process according to claim 5 wherein the polymer has a syndiotacticity of at least 75 percent at a racemic triad.

8. A process according to claim 1 wherein the catalyst is supported.

9. A process according to claim 1 wherein the molar ratio of catalyst:monomer is from $10^{-12}:1$ to $10^{-1}:1$.

* * * * *